United States Patent
Lin et al.

(10) Patent No.: US 10,061,171 B2
(45) Date of Patent: Aug. 28, 2018

(54) THIN FILM TRANSISTOR SUBSTRATE

(71) Applicant: InnoLux Corporation, Miao-Li County (TW)

(72) Inventors: Bi-Ly Lin, Miao-Li County (TW); Chung-Jun Kuo, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 16 days.

(21) Appl. No.: 15/240,321

(22) Filed: Aug. 18, 2016

(65) Prior Publication Data

US 2017/0052419 A1 Feb. 23, 2017

(30) Foreign Application Priority Data

Aug. 20, 2015 (CN) .......................... 2015 1 0513722

(51) Int. Cl.
*G02F 1/1362* (2006.01)
*G02F 1/1333* (2006.01)
*G02F 1/1368* (2006.01)
*G02F 1/1343* (2006.01)

(52) U.S. Cl.
CPC ...... *G02F 1/136259* (2013.01); *G02F 1/1368* (2013.01); *G02F 1/133345* (2013.01); *G02F 1/136209* (2013.01); *G02F 1/134309* (2013.01); *G02F 2001/134345* (2013.01); *G02F 2001/136263* (2013.01); *G02F 2001/136272* (2013.01); *G02F 2201/123* (2013.01); *G02F 2201/50* (2013.01)

(58) Field of Classification Search
CPC ......... G02F 1/136259; G02F 1/136209; G02F 1/1368; G02F 1/133345; G02F 2001/136272; G02F 1/134309; G02F 2201/123; G02F 2201/50; G02F 2001/136263; G02F 2001/134345
See application file for complete search history.

(56) References Cited

U.S. PATENT DOCUMENTS

| 2007/0242203 | A1* | 10/2007 | Lee | G02F 1/134363 349/141 |
| 2012/0081274 | A1* | 4/2012 | Chang | G02F 1/136259 345/92 |
| 2016/0246100 | A1* | 8/2016 | Kim | G02F 1/136209 |
| 2016/0322397 | A1* | 11/2016 | Lee | H01L 27/1244 |

* cited by examiner

*Primary Examiner* — Kevin Quaterman
(74) *Attorney, Agent, or Firm* — McClure, Qualey & Rodack, LLP

(57) ABSTRACT

A thin film transistor substrate is provided. The thin film transistor substrate includes a substrate; at least one signal line disposed over the substrate; a repair line disposed over the signal line and electrically connected to the signal line; and a light-shielding layer disposed over the repair line, wherein the light-shielding layer covers the repair line, and an area of the light-shielding layer is greater than that of the repair line.

14 Claims, 17 Drawing Sheets

THIN FILM TRANSISTOR SUBSTRATE

CROSS REFERENCE TO RELATED APPLICATIONS

This application claims priority of China Patent Application No. 201510513722.1, filed on Aug. 20, 2015, the entirety of which is incorporated by reference herein.

BACKGROUND

Technical Field

The disclosure relates to a thin film transistor substrate, and in particular to a thin film transistor substrate having a repair line.

Description of the Related Art

Display devices are being used more widely in the display elements of various products. Liquid-crystal molecules have different light polarization or light refraction effects at different alignment configurations, and liquid-crystal display devices utilize this characteristic to control light penetration to generate images. Conditional twisted nematic liquid-crystal display devices have good light penetration characteristics. However, they cannot provide a sufficient viewing angle due to their pixel design and structure, and due to the optical characteristics of the liquid-crystal molecules.

In order to solve this problem, various liquid-crystal display devices with wide-angle viewing and high aperture ratios have been developed, such as the in-plane switching liquid-crystal display device, and the fringe-field switching liquid-crystal display device.

The aforementioned display device includes a thin film transistor substrate. The thin film transistor substrate includes a data line and/or a gate line. However, due to the effects of the manufacturing process of film formation, photolithography and etching, the data line and/or gate line may break off or have an electrical connection failure, which results in a defect. As the resolution of the liquid-crystal display panel increases, since the data line and/or gate line are narrow due to the restriction of the aperture ratio, the risk of breaking off or electrical performance defects increases. Therefore, in order to prevent a decrease in the manufacturing yield of the liquid-crystal display panel due to line defects, it is necessary to repair the data line and/or gate line having the line defect. However, the existing repaired thin film transistor substrates have not been satisfactory in every respect.

SUMMARY

The present disclosure provides a thin film transistor substrate, including: a substrate; at least one signal line disposed over the substrate; a repair line disposed over the signal line and electrically connected to the signal line; and a light-shielding layer disposed over the repair line, wherein the light-shielding layer covers the repair line, and an area of the light-shielding layer is greater than that of the repair line.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
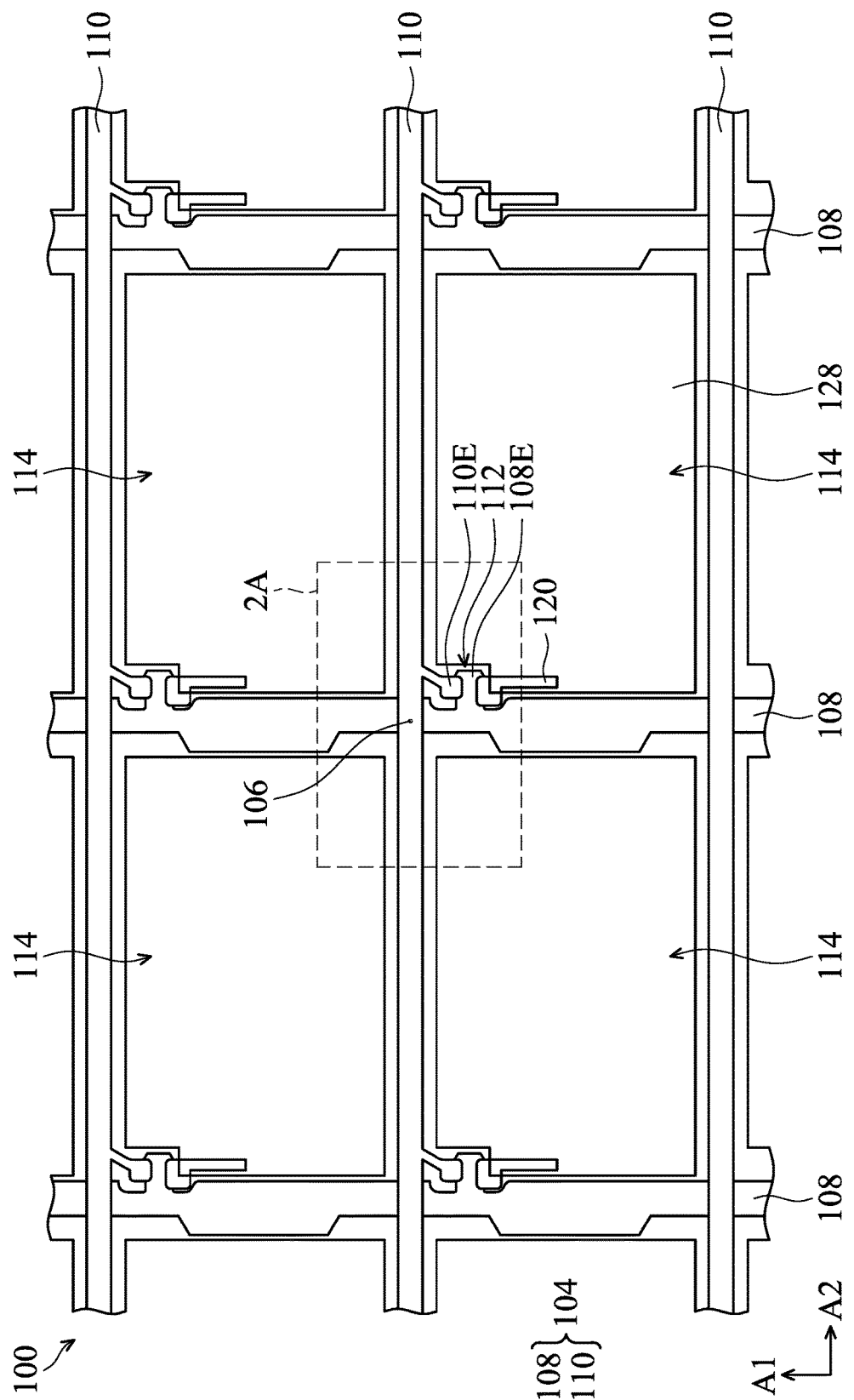
FIG. 1 is a top view of a thin film transistor substrate in accordance with some embodiments of the present disclosure.

The thin film transistor substrate of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

This description of the exemplary embodiments is intended to be read in connection with the accompanying drawings, which are to be considered part of the entire written description. The drawings are not drawn to scale. In addition, structures and devices are shown schematically in order to simplify the drawings.

In the description, relative terms such as "lower," "upper," "horizontal," "vertical,", "above," "below," "up," "down," "top" and "bottom" as well as terms that are derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The term "substrate" is meant to include devices formed within a transparent substrate and the layers overlying the transparent substrate. All transistor element needed may be already formed over the substrate. However, the substrate is represented with a flat surface in order to simplify the drawing. The term "substrate surface" is meant to include the uppermost exposed layers on a transparent substrate, such as an insulating layer and/or metallurgy lines.

The embodiment of the present disclosure utilizes a light-shielding layer which has a greater area than that of the repair line to shield against light leakage which may occur after the repair. Therefore, the yield of the repaired thin film transistor substrate may be improved.

FIG. 1 is a top view of a thin film transistor substrate 100 in accordance with some embodiments of the present disclosure. Referring to FIG. 1, the thin film transistor substrate 100, includes a substrate 102 (referring to FIG. 2B) and at least one signal line 104 disposed over the substrate 102. In addition, at least one of the signal lines 104 has an electrical connection failure structure 106.

Figure 2A:
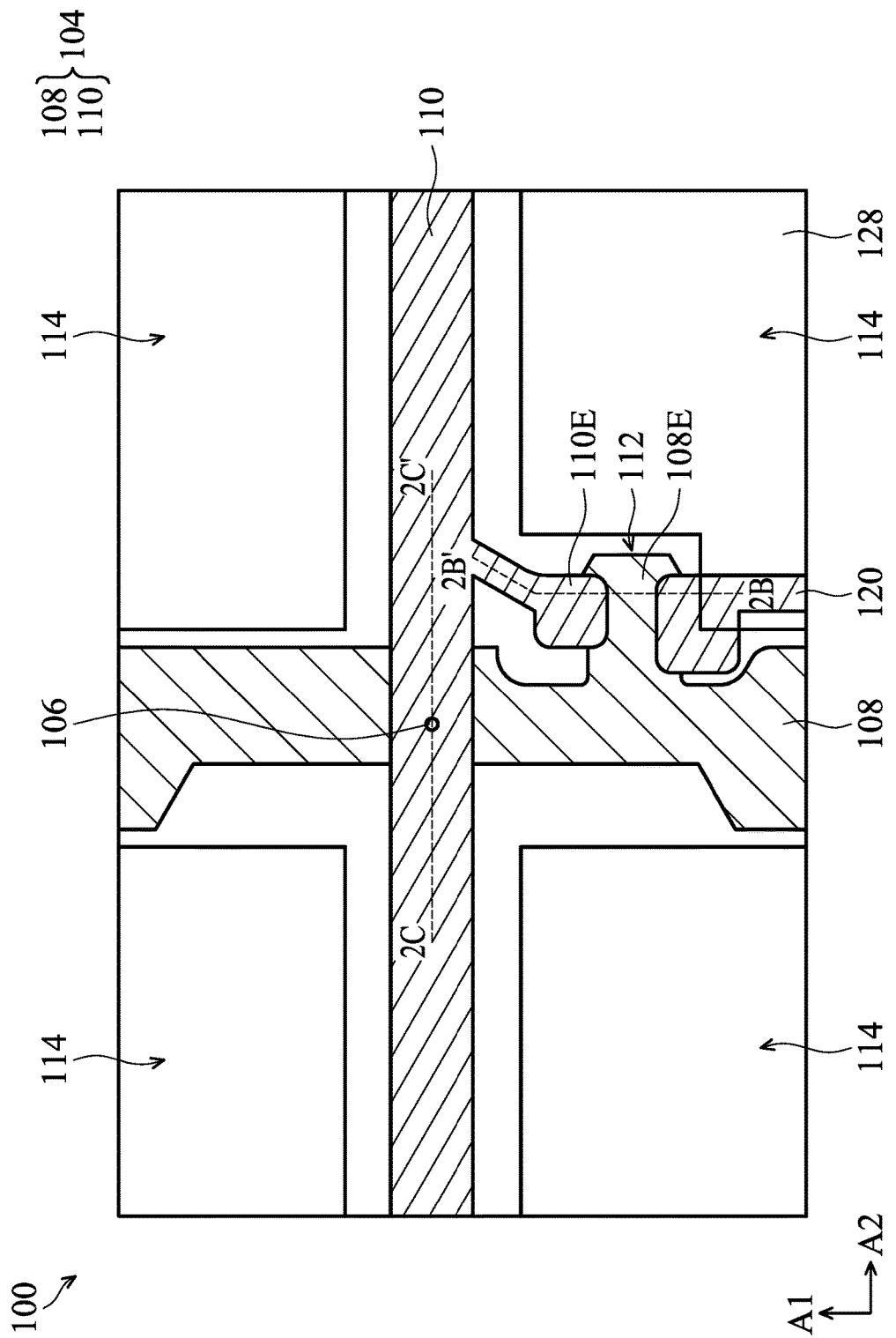
FIG. 2A is a top view of a thin film transistor substrate in accordance with some embodiments of the present disclosure.

In particular, referring to FIG. 2A, the signal lines 104 include a plurality of gate lines 108 and a plurality of data lines 110. The thin film transistor substrate 100 includes a thin film transistor 112. The data lines 110 may provide a source signal to the sub-pixel 114 through the thin film transistor 112, and the gate lines 108 may provide a scanning pulse signal to the sub-pixel 114 through the thin film transistor 112 and control the sub-pixel 114 cooperating with the aforementioned source signal. In addition, the gate line 108 extends along direction A1, and the direction A2 refers to a direction that is substantially perpendicular or orthogonal to the gate-line-extending direction A1. In some embodiments, the data line 110 extends along the direction A2 and is substantially perpendicular or orthogonal to the gate line 108. In addition, the plurality of gate lines 108 and the plurality of data lines 110 intersect to each other and define the sub-pixel 114.

Figure 2B:
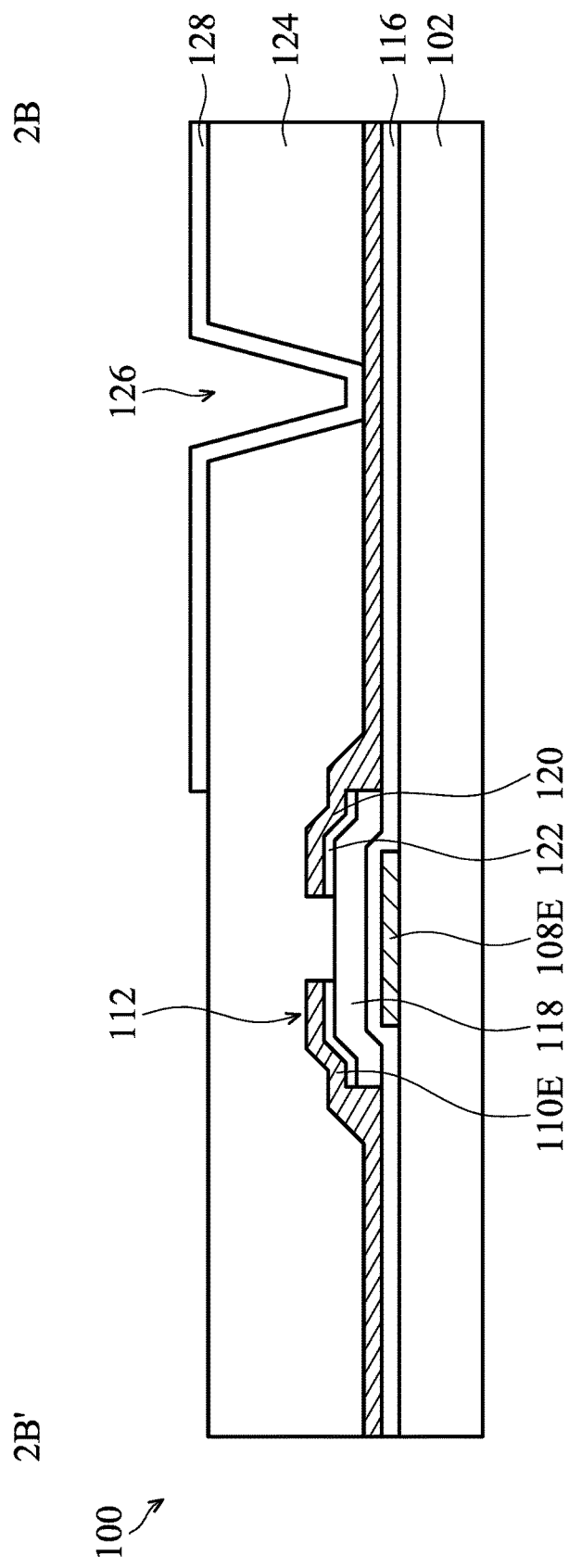
FIG. 2B is a cross-sectional view along line 2B-2B' in FIG. 2A in accordance with some embodiments of the present disclosure.

Referring to FIG. 2B, the substrate 102 may be a transparent substrate. The transparent substrate may include, but is not limited to, a glass substrate, a ceramic substrate, a plastic substrate, or any other suitable transparent substrate. The gate lines 108 and data line 110 may include, but is not limited to, copper, aluminum, tungsten, gold, chromium, nickel, platinum, titanium, iridium, rhodium, an alloy thereof, a combination thereof, or any other metal material with good conductivity. In other embodiments, the gate lines 108 and data line 110 includes a nonmetal material. The gate lines 108 and data line 110 may include any conductive material.

Figure 2C:
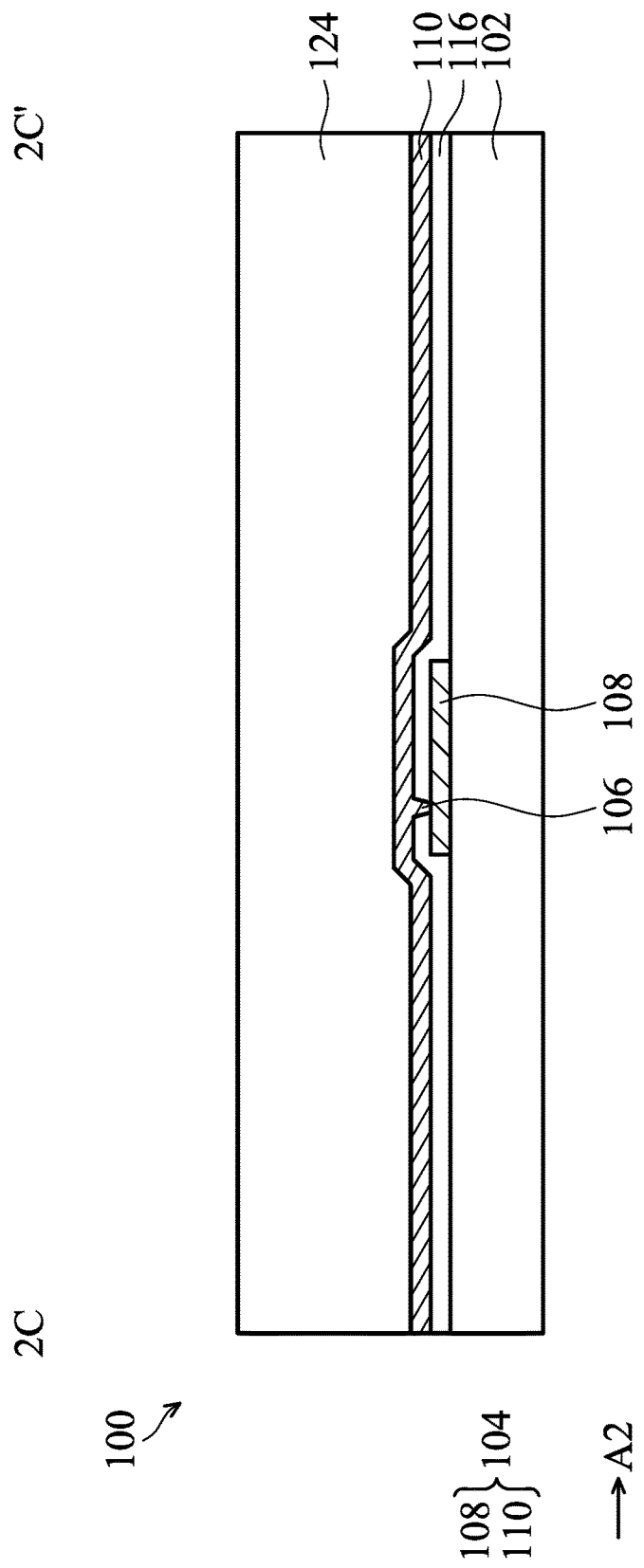
FIG. 2C is a cross-sectional view along line 2C-2C' in FIG. 2A in accordance with some embodiments of the present disclosure.

In addition, as shown in FIG. 2C, the gate line 108 is formed over the substrate 102. The gate dielectric layer 116 is formed over the substrate and covers the gate lines 108. The data line 110 is formed over the gate dielectric layer 116.

The gate dielectric layer 116 may include, but is not limited to, silicon oxide, silicon nitride, silicon oxynitride, high-k material, any other suitable dielectric material, or a combination thereof. The high-k material may include, but is not limited to, metal oxide, metal nitride, metal silicide, transition metal oxide, transition metal nitride, transition metal silicide, transition metal oxynitride, metal aluminate, zirconium silicate, zirconium aluminate. For example, the material of the high-k material may include, but is not limited to, LaO, AlO, ZrO, TiO, $Ta_2O_5$, $Y_2O_3$, $SrTiO_3$(STO), $BaTiO_3$(BTO), BaZrO, $HfO_2$, $HfO_3$, HfZrO, HfLaO, HfSiO, HfSiON, LaSiO, AlSiO, HfTaO, HfTiO, HfTaTiO, HfAlON, $(Ba,Sr)TiO_3$(BST), $Al_2O_3$, any other suitable high-k dielectric material, or a combination thereof. The gate dielectric layer may be formed by chemical vapor deposition or spin-on coating. The chemical vapor deposition may include, but is not limited to, low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD), or any other suitable method.

In addition, as shown in FIG. 2B, the thin film transistor 112 may include a gate electrode 108E, a semiconductor layer 118, a source electrode 110E, a drain electrode 120 and an ohmic contact layer 122. The gate electrode 108E extends from the gate line 108 along the direction A2. In one embodiment, the material of the gate electrode 108E may be the same as the material of the gate line 108, and the gate electrode 108E and the gate line 108 may be formed in the same manufacturing process. The semiconductor layer 118 is formed over the gate electrode 108E. In particular, the semiconductor layer 118 is formed over the gate dielectric layer 116 and overlaps the gate electrode 108E.

The semiconductor layer 118 may include an element semiconductor which may include silicon, germanium; a compound semiconductor which may include gallium nitride (GaN), silicon carbide, gallium arsenide, gallium phosphide, indium phosphide, indium arsenide and/or indium antimonide; an alloy semiconductor which may include SiGe alloy, GaAsP alloy, AlInAs alloy, AlGaAs alloy, GaInAs alloy, GaInP alloy and/or GaInAsP alloy; or a combination thereof. In one embodiment, the semiconductor layer 118 may be an un-doped semiconductor layer. However, in other embodiments, the semiconductor layer 118 may be a doped semiconductor layer such as a doped P-type semiconductor layer or a doped N-type semiconductor layer.

The source electrode 110E extends from the data line 110 and overlaps a portion of the semiconductor layer 118. The drain electrode 120 is spaced apart from the source electrode 110E by a predetermined distance and extends along the first direction A1. The drain electrode 120 also overlaps a portion of the semiconductor layer 118. In one embodiment, the material of the drain electrode 120 and source electrode 110E may be the same as the material of the data line 110, and the drain electrode 120, source electrode 110E and data line 110 may be formed in the same manufacturing process. The ohmic contact layer 122 is formed between the semiconductor layer 118 and the source electrode 110E, and between the semiconductor layer 118 and the drain electrode 120. The ohmic contact layer 122 may include amorphous silicon highly doped by ions such as $n^+$a-Si.

The thin film transistor substrate 100 further includes a protection layer 124. The protection layer 124 is formed over at least one of the signal lines 104. In particular, the protection layer 124 is formed over the gate dielectric layer 116 and covers the gate lines 108, the data lines 110 and the thin film transistor 112. The protection layer 124 may protect the thin film transistor 112 from physical or chemical damages.

The protection layer 124 may include, but is not limited to, an organic insulating material (such as light-sensitive resin) or an inorganic insulating material (such as silicon nitride, silicon oxide, silicon oxynitride, silicon carbide, aluminum oxide, or a combination thereof). The protection layer 124 may prevent the data lines 110, source electrode 110E, gate lines 108, and drain electrode 120 from contacting the air and moisture.

The protection layer 124 has an opening 126 exposing the drain electrode 120. The pixel electrode 128 is formed over the protection layer 124 and is electrically connected to the drain electrode 120 through the opening 126.

The material of the pixel electrode 128 may include, but is not limited to, transparent conductive material such as indium tin oxide (ITO), tin oxide (TO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxide.

In FIG. 1, an embodiment with the electrical connection failure structure 106 forming at the intersection of the gate line 108 and data line 110 is described. As shown in FIG. 2C, the gate line 108 and data line 110 which should be electrically isolated from each other are electrically connected to each other due to the electrical connection failure structure 106 at the intersection of the gate line 108 and data line 110.

Figure 3A:
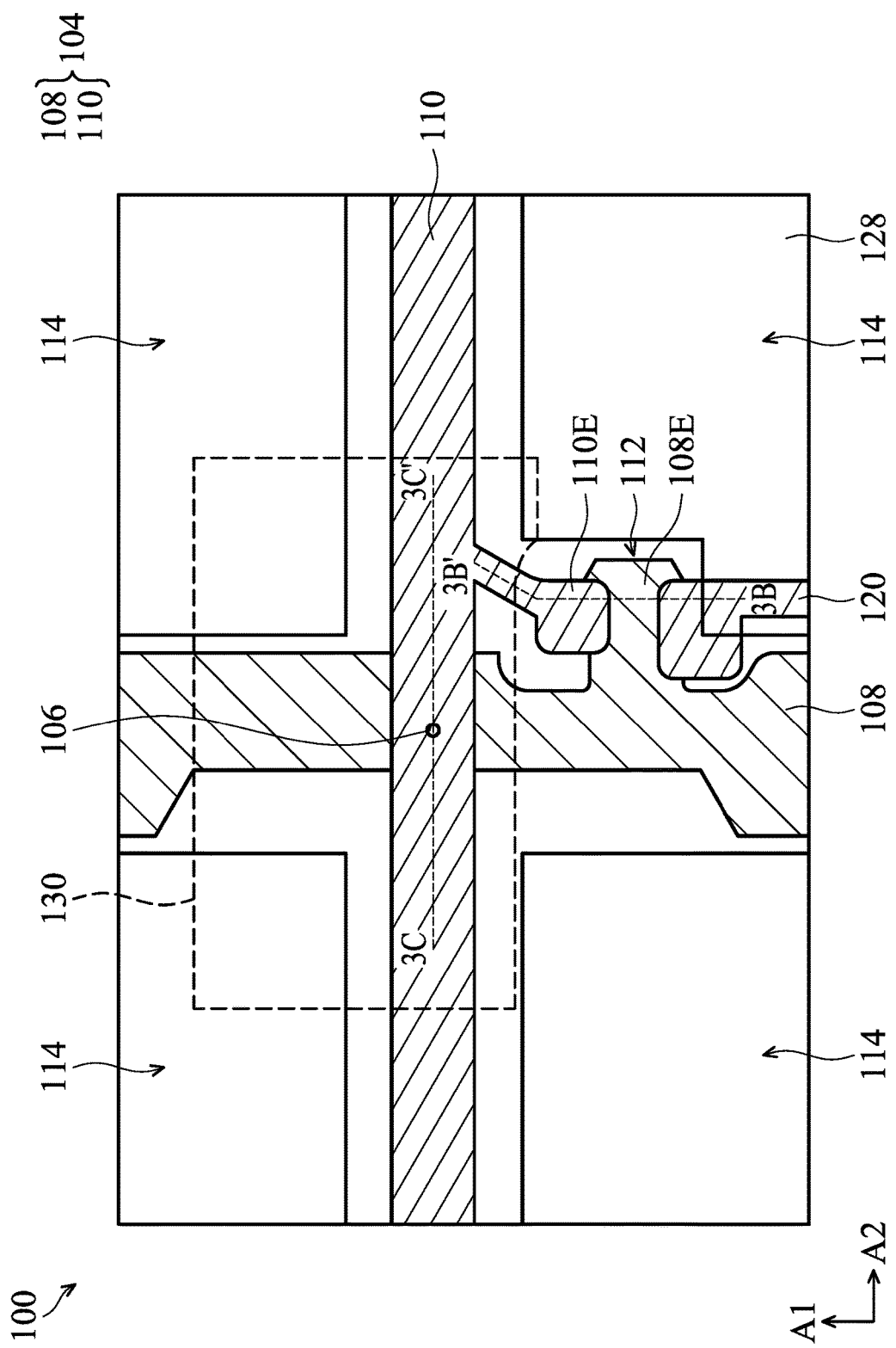
FIG. 3A is a top view of a thin film transistor substrate in accordance with some embodiments of the present disclosure.
Figure 3B:
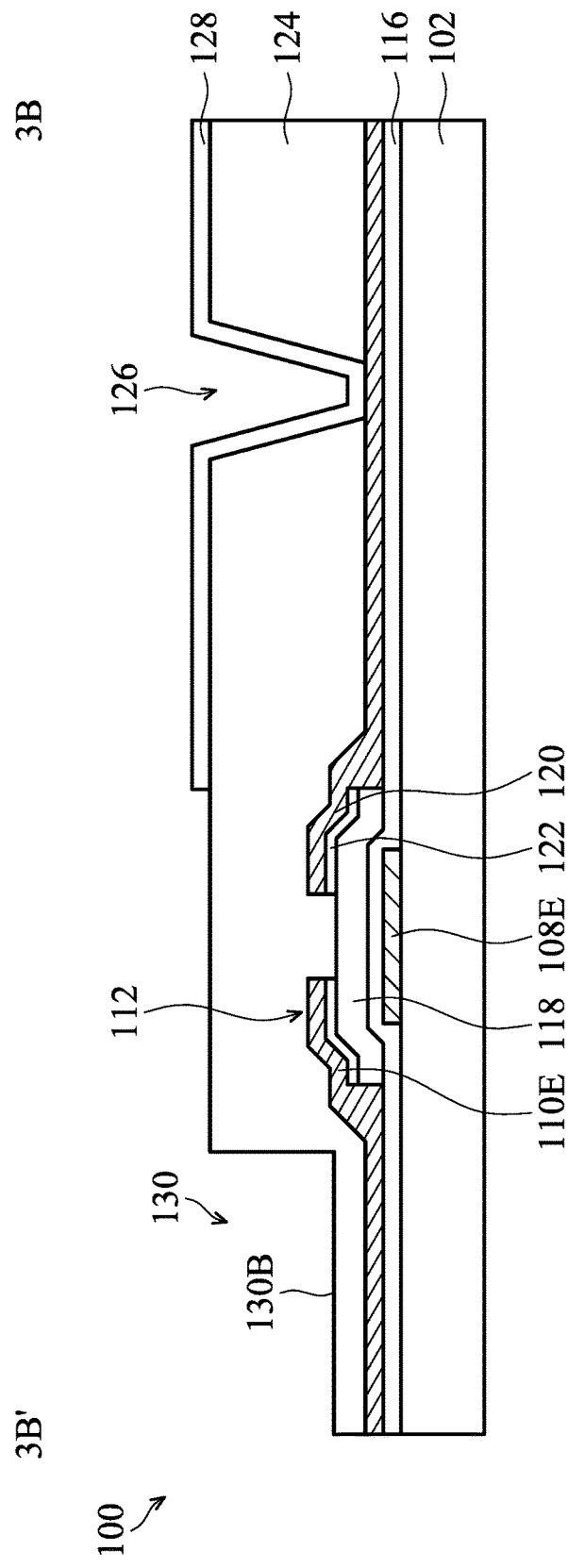
FIG. 3B is a cross-sectional view along line 3B-3B' in FIG. 3A in accordance with some embodiments of the present disclosure.
Figure 3C:
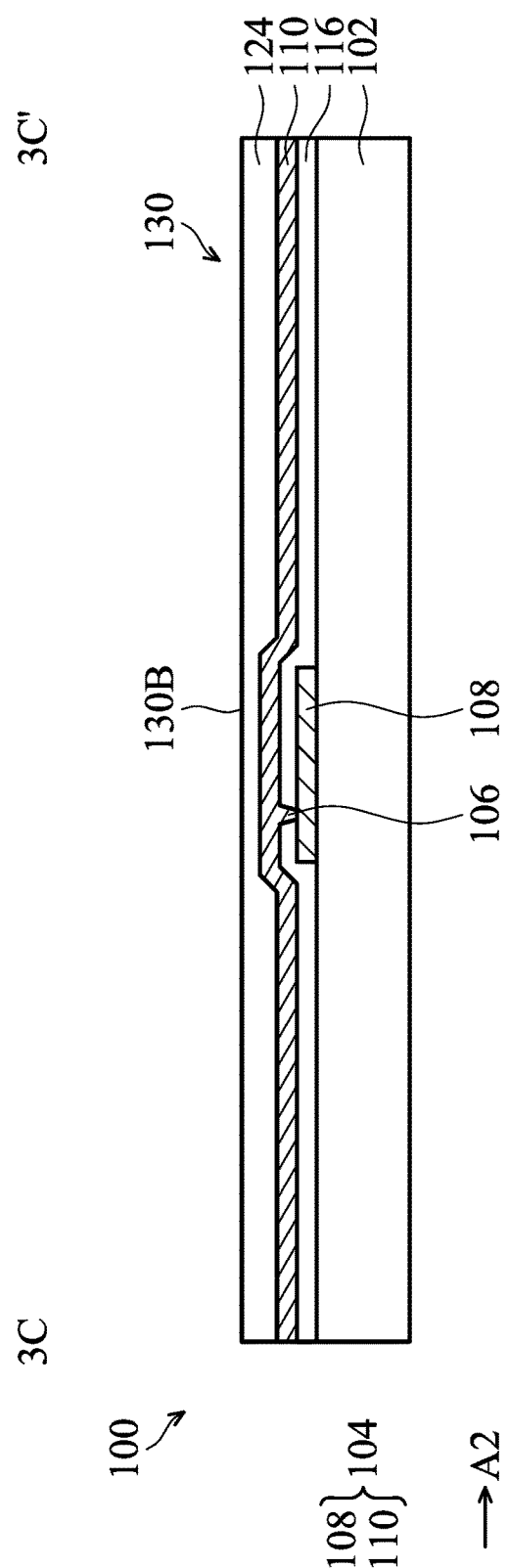
FIG. 3C is a cross-sectional view along line 3C-3C' in FIG. 3A in accordance with some embodiments of the present disclosure.

Next, referring to FIGS. 3A-3C, FIG. 3A is a partially enlarged figure of region 3A in FIG. 1, FIG. 3B is a cross-sectional view of the thin film transistor 112 along line 3B-3B' in FIG. 3A in accordance with some embodiments of the present disclosure, FIG. 3C is a cross-sectional view of the intersection of the gate line 108 and data line 110 along line 3C-3C' in FIG. 3A in accordance with some embodiments of the present disclosure. As shown in FIG. 3B, a recess 130 is formed in the protection layer 124. The recess 130 partially extends into the protection layer 124 and does not penetrate through the protection layer 124. The recess 130 does not expose the gate line 108, source electrode 110E and data line 110.

A laser beam may be irradiated onto the protecting layer 124 to remove a portion of the protecting layer 124 to form the recess 130. The laser beam may include a continuous wave (CW) laser beam. The wavelength of the laser beam may be about 340 to about 360 nm.

In other embodiments, the recess 130 may be formed by an etch process. The etch process may include wet etch, dry etch, or a combination thereof. The wet etch may include, but is not limited to, immersion etching, spray etching, or any other suitable etch process, or a combination thereof. The dry etch may include, but is not limited to, capacitively coupled plasma etching, inductively-coupled plasma etching, helicon plasma etching, electron cyclotron resonance plasma etching or any other suitable dry etch process, or a combination thereof. The dry etch process employs a process gas, which may include, but is not limited to, inert gas, fluorine-containing gas, chlorine-containing gas, bromine-containing gas, iodine-containing gas, a combination thereof or any other suitable gases. In some embodiments of the present disclosure, the processing gas may include, but is not limited to, Ar, $CF_4$, $SF_6$, $CH_2F_2$, $C_2F_6$, $Cl_2$, $CHCl_3$, $CCl_4$, HBr, $CHBr_3$, $BF_3$, $BCl_3$, a combination thereof, or any other suitable gases.

In addition, as shown in FIG. 3A, in some embodiments, the recess 130 overlaps the four sub-pixels 114 which are adjacent to the electrical connection failure structure 106. However, in other embodiments, the recess 130 may overlap with only one, two or three sub-pixel 114 which are adjacent to the electrical connection failure structure 106.

In addition, in other embodiments, since the pixel electrode 128 is also removed when the recess 130 is formed, there is no pixel electrode 128 in the region that the recess 130 corresponds to.

Figure 4A:
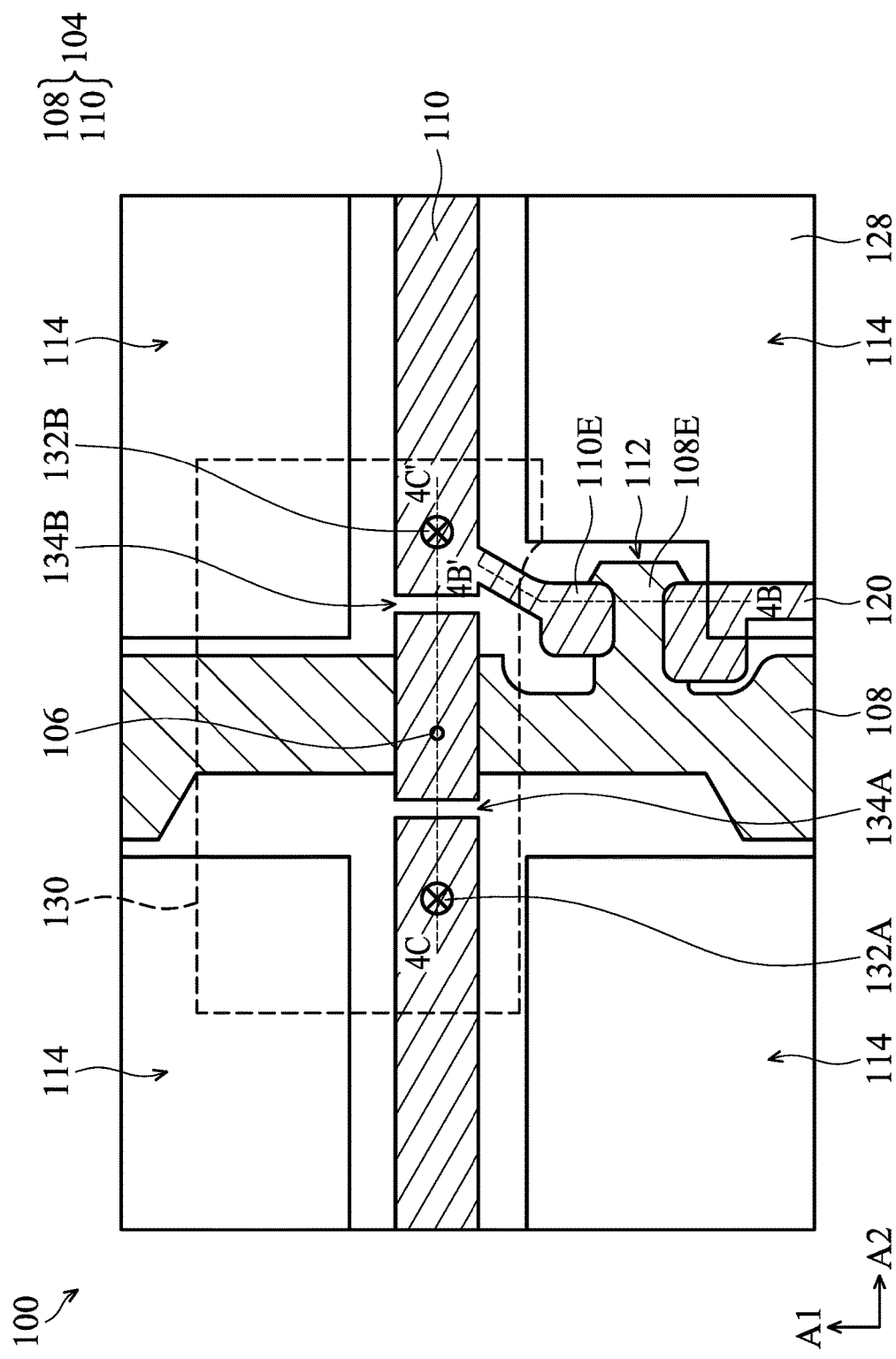
FIG. 4A is a top view of a thin film transistor substrate in accordance with some embodiments of the present disclosure.
Figure 4B:
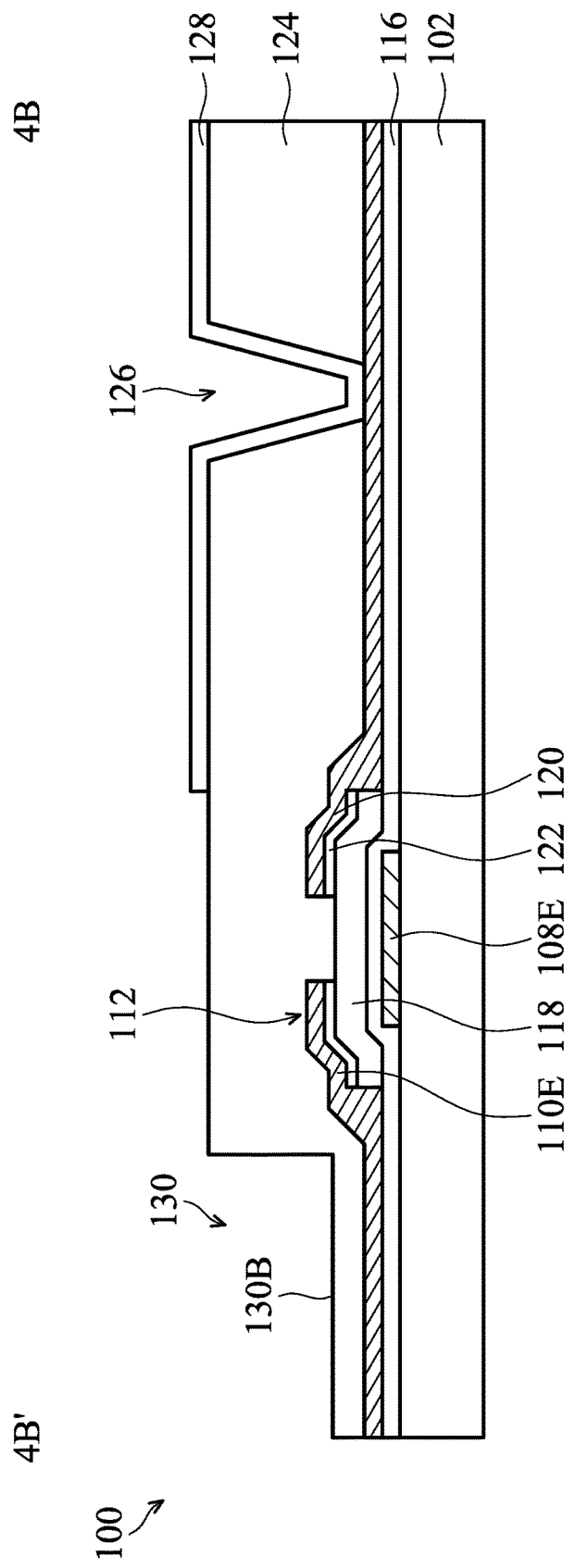
FIG. 4B is a cross-sectional view along line 4B-4B' in FIG. 4A in accordance with some embodiments of the present disclosure.
Figure 4C:
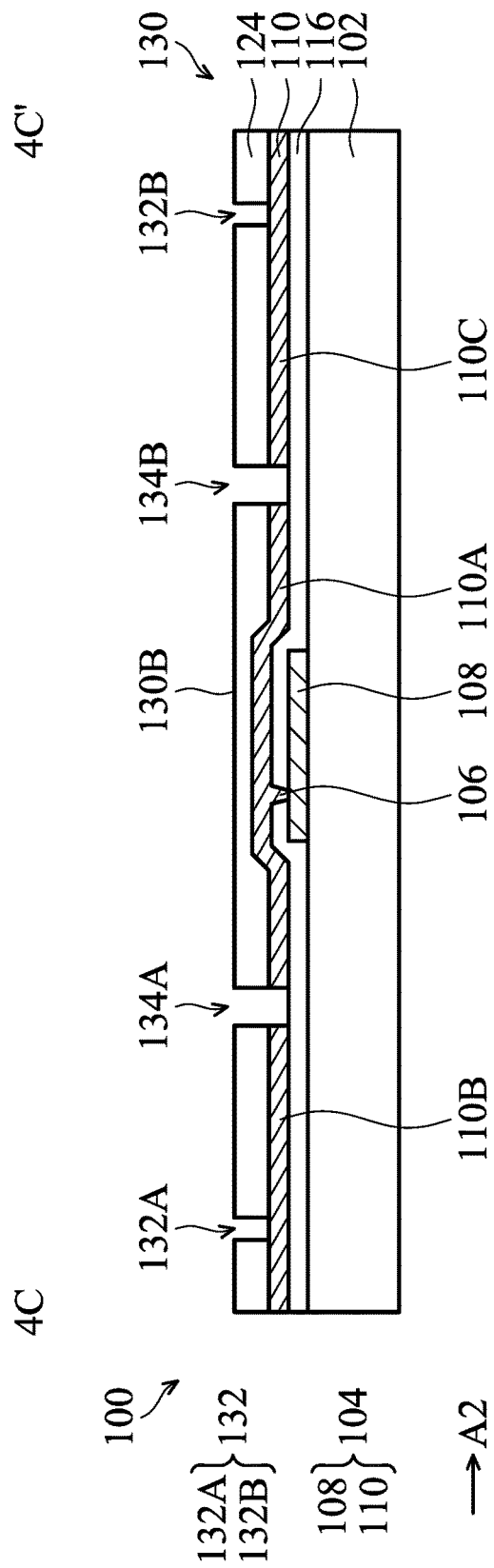
FIG. 4C is a cross-sectional view along line 4C-4C' in FIG. 4A in accordance with some embodiments of the present disclosure.
Figure 4D:
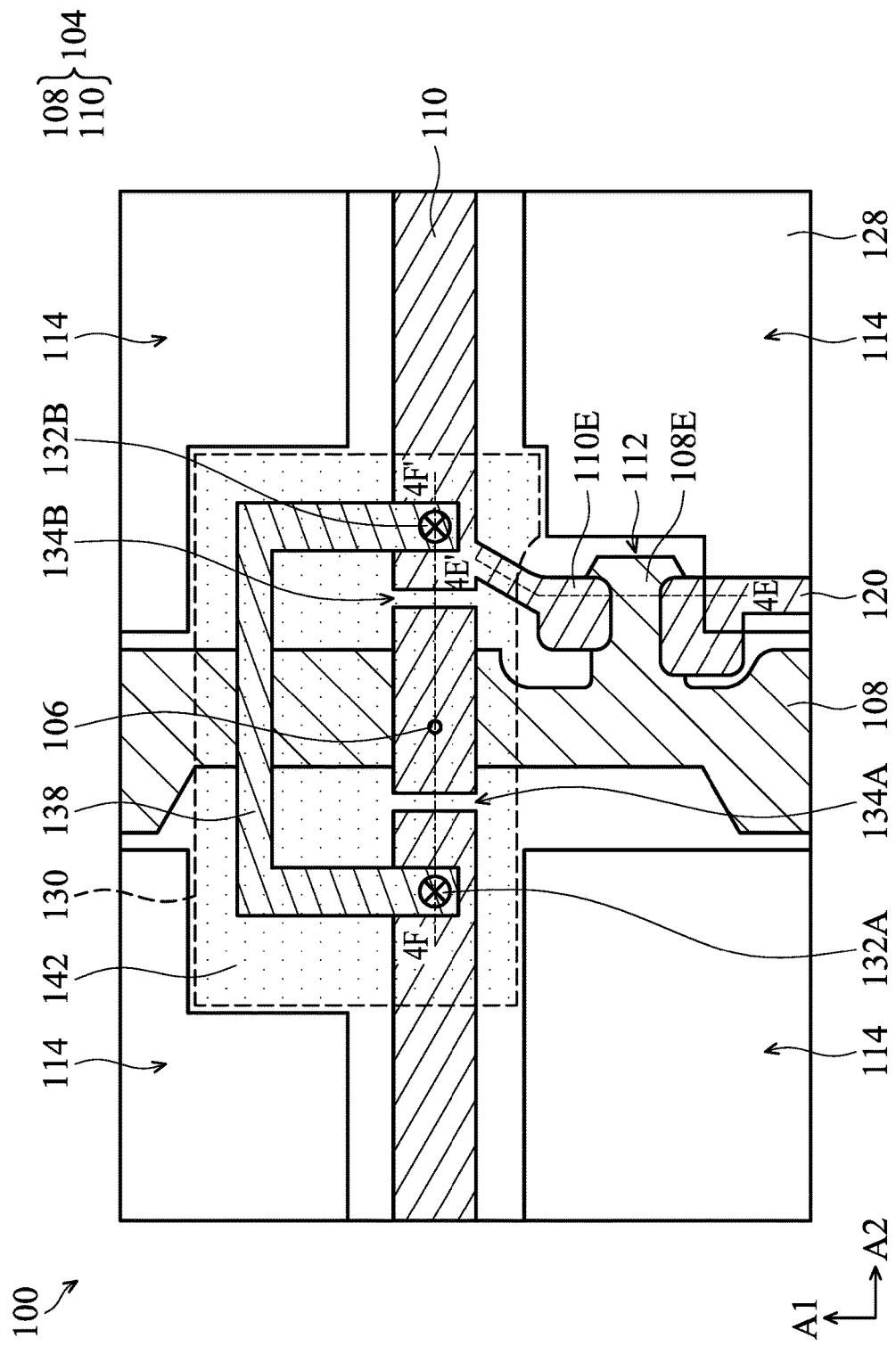
FIG. 4D is a top view of a thin film transistor substrate in accordance with some embodiments of the present disclosure.
Figure 4E:
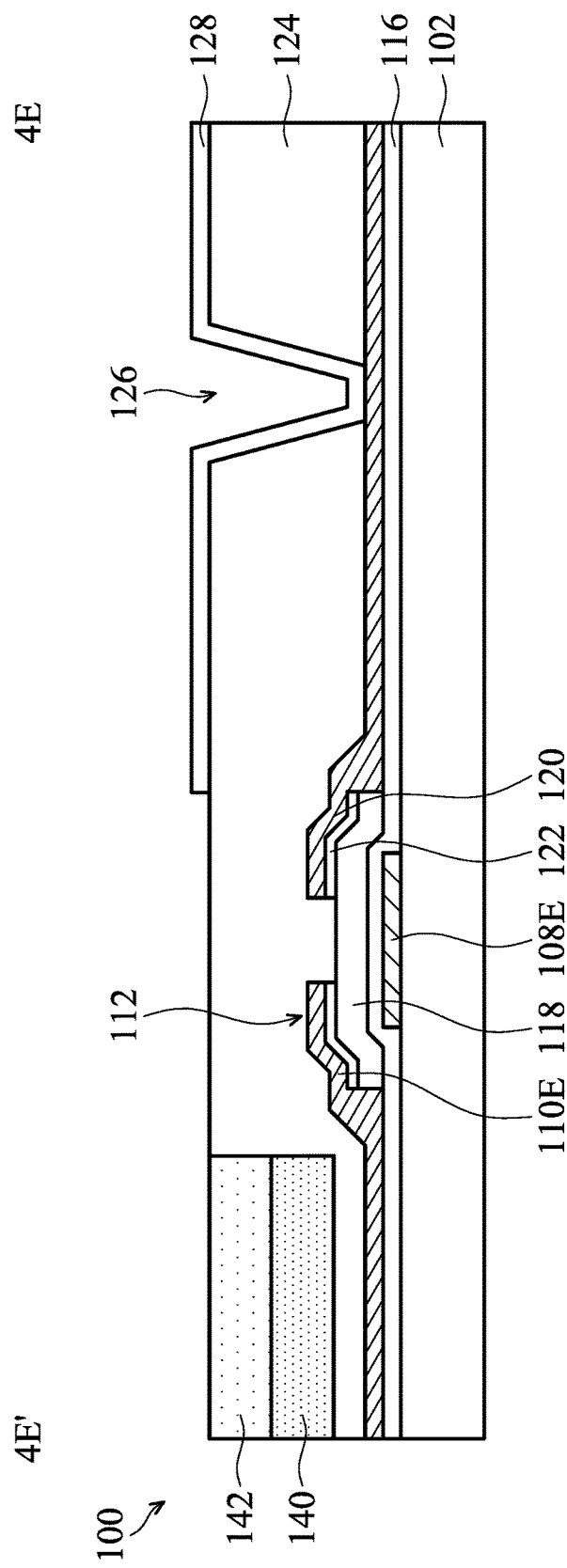
FIG. 4E is a cross-sectional view along line 4E-4E' in FIG. 4A in accordance with some embodiments of the present disclosure.
Figure 4F:
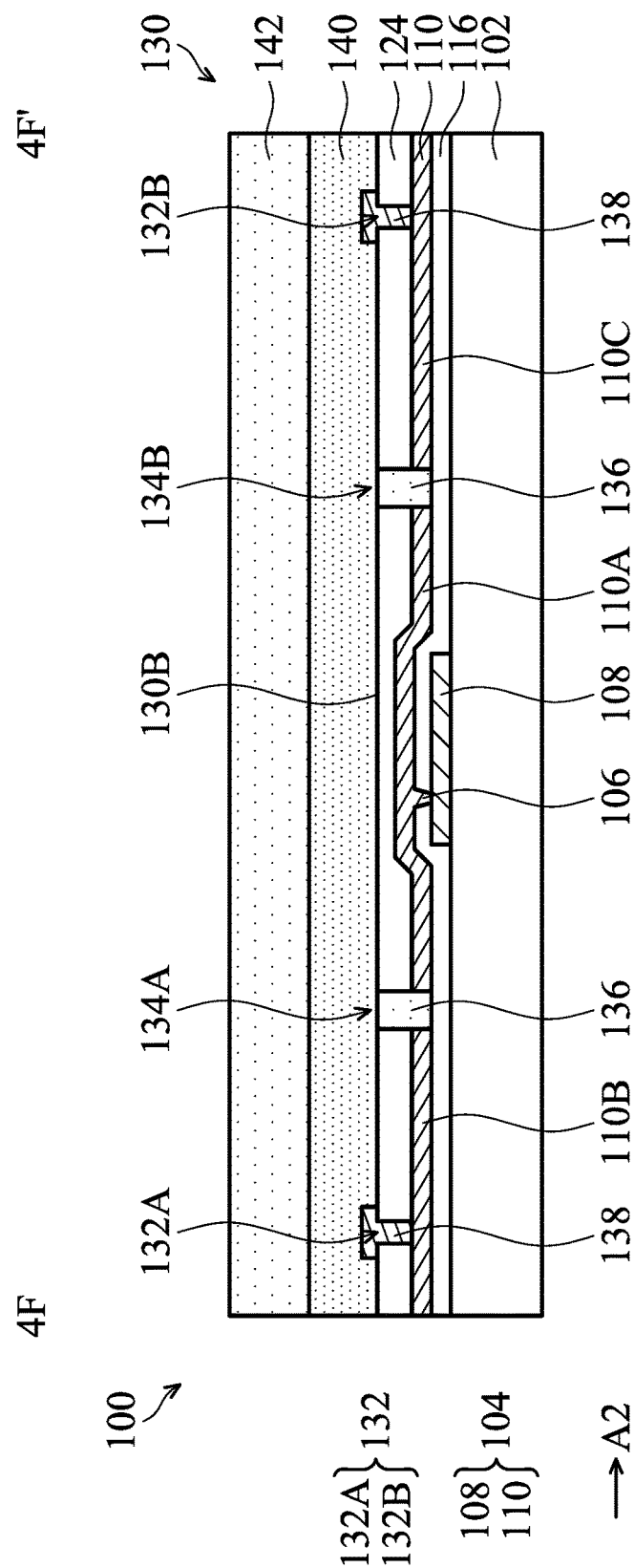
FIG. 4F is a cross-sectional view along line 4F-4F' in FIG. 4A in accordance with some embodiments of the present disclosure.

FIGS. 4A-4F depict the method for repairing the failure due to the electrical connection failure structure 106. FIGS. 4A-4C show the first step of the repair method, and FIGS. 4D-4F show the second step of the repair method. FIG. 4A is a partially enlarged figure of region 4A in FIG. 1, FIG. 4B is a cross-sectional view of the thin film transistor 112 along line 4B-4B' in FIG. 4A in accordance with some embodiments of the present disclosure, FIG. 4C is a cross-sectional view of the intersection of the gate line 108 and data line 110 along line 4C-4C' in FIG. 4A in accordance with some embodiments of the present disclosure. As shown in FIG. 4C, a first contact hole 132A and a second contact hole 132B are respectively formed at two opposite sides of the electrical connection failure structure 106. The first contact hole 132A and the second contact hole 132B extend downward from the bottom surface 130B of the recess 130 and expose a portion of the signal line 104 having the electrical connection failure structure 106. For example, in one embodiment, the first contact hole 132A and the second contact hole 132B expose a portion of the data line 110 having the electrical connection failure structure 106.

A laser beam may be irradiated onto the protecting layer 124 to remove a portion of the protecting layer 124 to form the first contact hole 132A and the second contact hole 132B. The laser beam may include a continuous wave (CW) laser beam. The wavelength of the laser beam may be about 340 to about 360 nm.

In other embodiments, the first contact hole 132A and the second contact hole 132B may be formed by an etch process. The etch process may include wet etch, dry etch, or a combination thereof. The wet etch may include, but is not limited to, immersion etching, spray etching, or any other suitable etch process, or a combination thereof. The dry etch may include, but is not limited to, capacitively coupled plasma etching, inductively-coupled plasma etching, helicon plasma etching, electron cyclotron resonance plasma etching or any other suitable dry etch process, or a combination thereof. The dry etch process employs a process gas, which may include, but is not limited to, inert gas, fluorine-containing gas, chlorine-containing gas, bromine-containing gas, iodine-containing gas, a combination thereof or any other suitable gases. In some embodiments of the present disclosure, the processing gas may include, but is not limited to, Ar, $CF_4$, $SF_6$, $CH_2F_2$, $CHF_3$, $C_2F_6$, $Cl_2$, $CHCl_3$, $CCl_4$, HBr, $CHBr_3$, $BF_3$, $BCl_3$, a combination thereof or any other suitable gases.

Next, a first disconnecting groove 134A and a second disconnecting groove 134B are formed over the two data lines 110 at the two opposite sides of the electrical connection failure structure 106, respectively. The first disconnecting groove 134A and the second disconnecting groove 134B both extend downward from the bottom surface 130B of the recess 130 and completely cut off data line 110 so as to separate the data line 110 into an isolation portion 110A having the electrical connection failure structure 106, and a first portion 110B and second portion 110C disposed at opposite sides of the isolation portion 110A.

In particular, the first disconnecting groove 134A separates the isolation portion 110A and first portion 110B and electrically isolates the isolation portion 110A and first portion 110B. The second disconnecting groove 134B separates the isolation portion 110A and second portion 110C and electrically isolates the isolation portion 110A and second portion 110C. The first contact hole 132A and the second contact hole 132B are disposed corresponding to the first portion 110B and second portion 110C of the data line 110, respectively. In other words, the first contact hole 132A and the second contact hole 132B expose the first portion 110B and second portion 110C of the data line 110, respectively.

A laser beam may be irradiated onto the protecting layer 124 and data line 110 to remove a portion of the protecting layer 124 and a portion of the data line 110 to form the first disconnecting groove 134A and the second disconnecting groove 134B. The laser beam may include a pulse laser beam. For example, in one embodiment, a wavelength of the pulse laser beam may be about 1063 nm, about 532 nm, or about 355 nm.

In other embodiments, the first disconnecting groove 134A and the second disconnecting groove 134B may be formed by an etch process. The etch process may include wet etch, dry etch, or a combination thereof. The wet etch may include, but is not limited to, immersion etching, spray etching, or any other suitable etch process, or a combination thereof. The dry etch may include, but is not limited to, capacitively coupled plasma etching, inductively-coupled plasma etching, helicon plasma etching, electron cyclotron resonance plasma etching or any other suitable dry etch process, or a combination thereof. The dry etch process employs a process gas, which may include, but is not limited to, inert gas, fluorine-containing gas, chlorine-containing gas, bromine-containing gas, iodine-containing gas, a combination thereof or any other suitable gases. In some embodiments of the present disclosure, the processing gas may include, but is not limited to, Ar, $CF_4$, $SF_6$, $CH_2F_2$, $CHF_3$, $C_2F_6$, $Cl_2$, $CHCl_3$, $CCl_4$, HBr, $CHBr_3$, $BF_3$, $BCl_3$, a combination thereof or any other suitable gases.

It should be noted that the order of forming the recess, the contact holes and the disconnecting grooves is not limited to the embodiments mentioned above. For example, in one embodiment, the contact holes may be formed first, the recess is then formed. Alternatively, in other embodiments, the disconnecting grooves may be formed first, the contact holes are then formed, and the recess is formed last. Therefore, the inventive concept and scope are not limited to the exemplary embodiment shown in FIGS. 4A-4C.

FIGS. 4D-4F show the second step of the repair method. FIG. 4D is a partially enlarged figure of region 4D in FIG. 1, FIG. 4E is a cross-sectional view of the thin film transistor 112 along line 4E-4E' in FIG. 4D in accordance with some embodiments of the present disclosure, FIG. 4F is a cross-sectional view of the intersection of the gate line 108 and data line 110 along line 4F-4F' in FIG. 4D in accordance with some embodiments of the present disclosure. As shown in FIG. 4F, an insulating material 136 is formed in the first disconnecting groove 134A and the second disconnecting groove 134B. The material of the insulating material 136 may include, but is not limited to, silicon oxide, silicon nitride, silicon oxynitride, a combination thereof, or any other suitable material.

The insulating material 136 completely covers the sidewalls of the data line 110 in the first disconnecting groove 134A and the second disconnecting groove 134B to prevent the electrical connection between the isolation portion 110A and first portion 110B or between the isolation portion 110A and second portion 110C.

Subsequently, a repair line 138 is formed over the signal line 104. The repair line 138 electrically connects the signal line 104 having the electrical connection failure structure 106 (such as the data line 110 in this embodiment). In particular, the repair line 138 is formed in the recess 130 and is electrically connected to the signal line 104 having the electrical connection failure structure 106 through the first contact hole 132A and the second contact hole 132B.

For example, in one embodiment, the repair line 138 is electrically connected to the first portion 110B and second portion 110C of the data line 110 in order to prevent the data line from breaking off and becoming electrically isolated from the gate line 108 at the same time.

The material of the repair line 138 may include, but is not limited to, tungsten (W), molybdenum (Mo), nickel (Ni), chromium (Cr), iron (Fe), or any other suitable conductive material. The repair line 138 may be deposited through a laser chemical vapor deposition (CVD) method. The laser CVD method partially irradiates a laser beam onto an object to deposit a vaporized material where the laser beam is irradiated.

In some embodiments, the repair line 138 may have a 'U' shape as shown in FIG. 4D. However, in other embodiments, the repair line 138 may have other shapes.

Next, a light-shielding layer 140 is formed over the repair line 138. The light-shielding layer 140 completely covers the repair line 138. In addition, as shown in FIGS. 4D and 4F, the area of the light-shielding layer 140 is greater than that of the repair line 138.

Since the area of the light-shielding layer 140 is greater than that of the repair line 138, the defects such as the light leak phenomenon due to the repair line may be shielded, which in turn improves the yield of the repaired thin film transistor substrate.

The material of the light-shielding layer 140 may include, but is not limited to, high-dielectric constant material (high-k material), metal, black photoresist, black printing ink or black resin. The high-k material may include, but is not limited to, metal oxide, metal nitride, metal silicide, transition metal oxide, transition metal nitride, transition metal silicide, transition metal oxynitride, metal aluminate, zirconium silicate, zirconium aluminate. For example, the material of the high-k material may include, but is not limited to, LaO, AlO, ZrO, TiO, $Ta_2O_5$, $Y_2O_3$, $SrTiO_3$(STO) $BaTiO_3$(BTO), BaZrO, $HfO_2$, $HfO_3$, HfZrO, HfLaO, HfSiO, HfSiON, LaSiO, AlSiO, HfTaO, HfTiO, HfTaTiO, HfAlON, $(Ba,Sr)TiO_3$(BST), $Al_2O_3$, any other suitable high-k dielectric material, or a combination thereof.

In addition, as shown in FIGS. 4D-4F, the repair line 138 does not directly contact the sidewall of the recess 130. In other words, there is a space disposed between the repair line 138 and a sidewall of the recess 130. The light-shielding layer 140 is filled into the recess 130 and is in direct contact with the sidewall of the recess 130. The light-shielding layer 140 is further filled into the space between the repair line 138 and the sidewall of the recess 130.

Still referring to FIGS. 4A-4F, after forming the light-shielding layer 140, a low-dielectric constant material layer 142 may be formed over the light-shielding layer 140. The dielectric constant of the low-dielectric constant material layer 142 is lower than that of the light-shielding layer 140. The material of the low-dielectric constant material layer 142 may include, but is not limited to, phosphosilicate glass (PSG), borophosphosilicate glass (BPSG), fluorinated silicate glass (FSG), carbon-doped silicon oxide ($SiO_xC_y$), spin-on-glass, spin-on-polymers, silicon carbide material, or a compound thereof, or a composite material thereof, or a combination thereof, or any other suitable low-dielectric constant material.

In addition, as shown in FIGS. 4D and 4F, the low-dielectric constant material layer 142 is filled into the recess 130 and is in direct contact with the sidewall of the recess 130. In some embodiments, since the light-shielding layer 140 and the low-dielectric constant material layer 142 are both filled into the recess 130, the light-shielding layer 140 and the low-dielectric constant material layer 142 have the same shape when viewed from a cross-sectional view.

Since the light-shielding layer has a greater dielectric constant, it may result in induced electric potential due to the electric current on the repair line. Therefore, defects such as current leakage or light leakage may result due to the aforementioned induced electric potential if there is only the light-shielding layer disposed over the repair line. Therefore, if a low-dielectric constant material layer is formed over the light-shielding layer, the aforementioned defects such as current leakage or light leakage may be prevented, which in turn further improves the yield of the repaired thin film transistor substrate.

In addition, if there is a pixel electrode disposed in the recess, it may result in an induced electric potential due to the electric current on the repair line. Therefore, defects such as current leakage or light leakage may result due to the aforementioned induced electric potential. Therefore, by disposing the pixel electrode outside the region to which the recess corresponds, the aforementioned defects such as current leakage or light leakage may be prevented, which in turn further improves the yield of the repaired thin film transistor substrate.

Still referring to FIG. 4F, the present disclosure provides a thin film transistor substrate 100. The thin film transistor substrate 100 includes a substrate 102 and at least one signal line 104 disposed over the substrate 102. The signal lines 104 include a plurality of gate lines 108 and a plurality of data lines 110. One of the signal lines 104 has an electrical connection failure structure 106. The thin film transistor substrate 100 further includes a repair line 138 disposed over the signal line 104. The repair line 138 is electrically connected to the signal line 104 having the electrical connection failure structure 106. The thin film transistor substrate 100 further includes a light-shielding layer 140 disposed over the repair line 138. The light-shielding layer 140 completely covers the repair line 138, and the area of the light-shielding layer 140 is greater than that of the repair line 138.

In addition, the thin film transistor substrate 100 further includes a low-dielectric constant material layer 142 disposed over the light-shielding layer 140. In addition, the thin film transistor substrate 100 further includes a protection layer 124 disposed over at least one signal line 104 and a pixel electrode 128 disposed over the protection layer 124. The thin film transistor substrate 100 further includes a recess 130 disposed in the protection layer 124 and a first contact hole 132A and a second contact hole 132B which extend downward from the bottom surface 130B of the recess 130 and expose a portion of the signal line 104 having the electrical connection failure structure 106. The repair line 138 is formed in the recess 130 and is electrically connected to the signal line 104 having the electrical connection failure structure 106 through the contact holes 132. In addition, the pixel electrode 128 is disposed outside the region that the recess 130 corresponds to.

Figure 5:
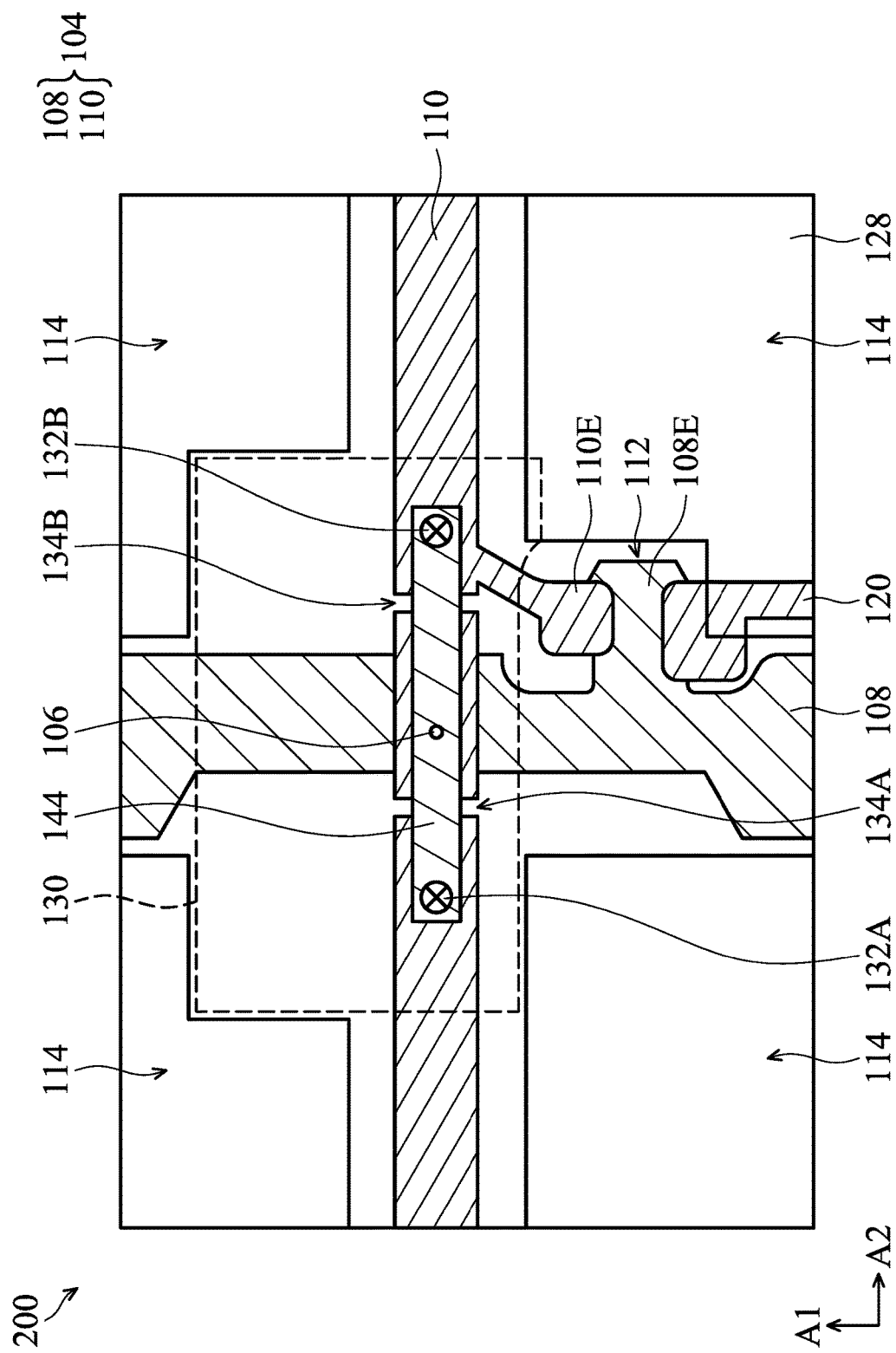
FIG. 5 is a top view of a thin film transistor substrate in accordance with another embodiment of the present disclosure.

It should be noted that the exemplary embodiment set forth in FIG. 4D is merely for the purpose of illustration. In addition to the embodiment set forth in FIG. 4D, the repair line may have other shapes as shown in FIG. 5. This will be described in detail in the following description. Therefore, the inventive concept and scope are not limited to the exemplary embodiment shown in FIG. 4D.

Note that the same or similar elements or layers corresponding to those of the semiconductor device are denoted by like reference numerals. The same or similar elements or layers denoted by like reference numerals have the same meaning and will not be repeated for the sake of brevity.

FIG. 5 is a top view of a thin film transistor substrate 200 in accordance with another embodiment of the present disclosure. The difference between the embodiments shown in FIGS. 5 and 4D is that the repair line 144 has a rectangular shape and laterally across the first disconnecting groove 134A and the second disconnecting groove 134B. The repair line 144 is substantially parallel to the data line 110. The repair line 144 overlaps the data line 110.

Figure 6:
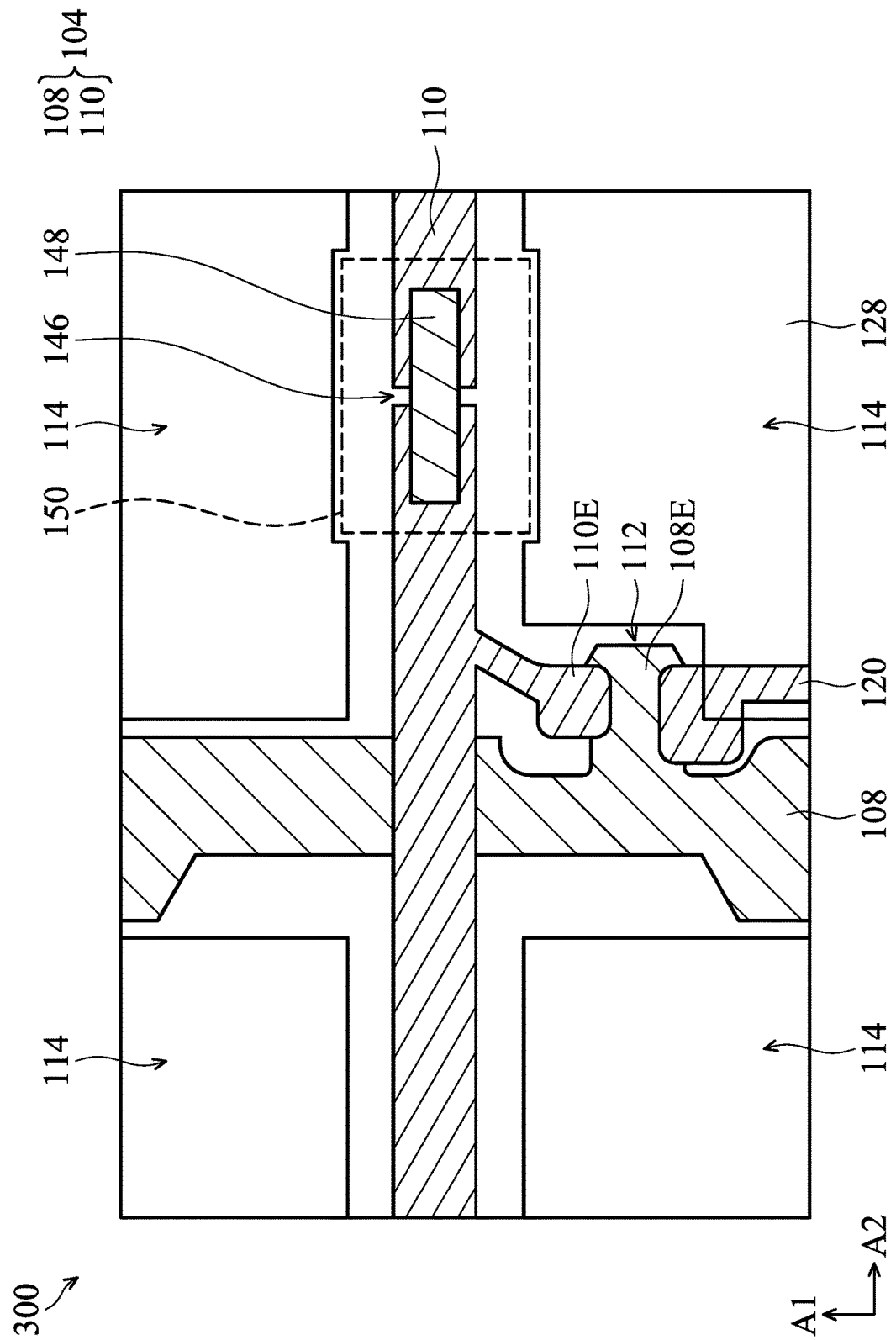
FIG. 6 is a top view of a thin film transistor substrate in accordance with another embodiment of the present disclosure.
Figure 7:
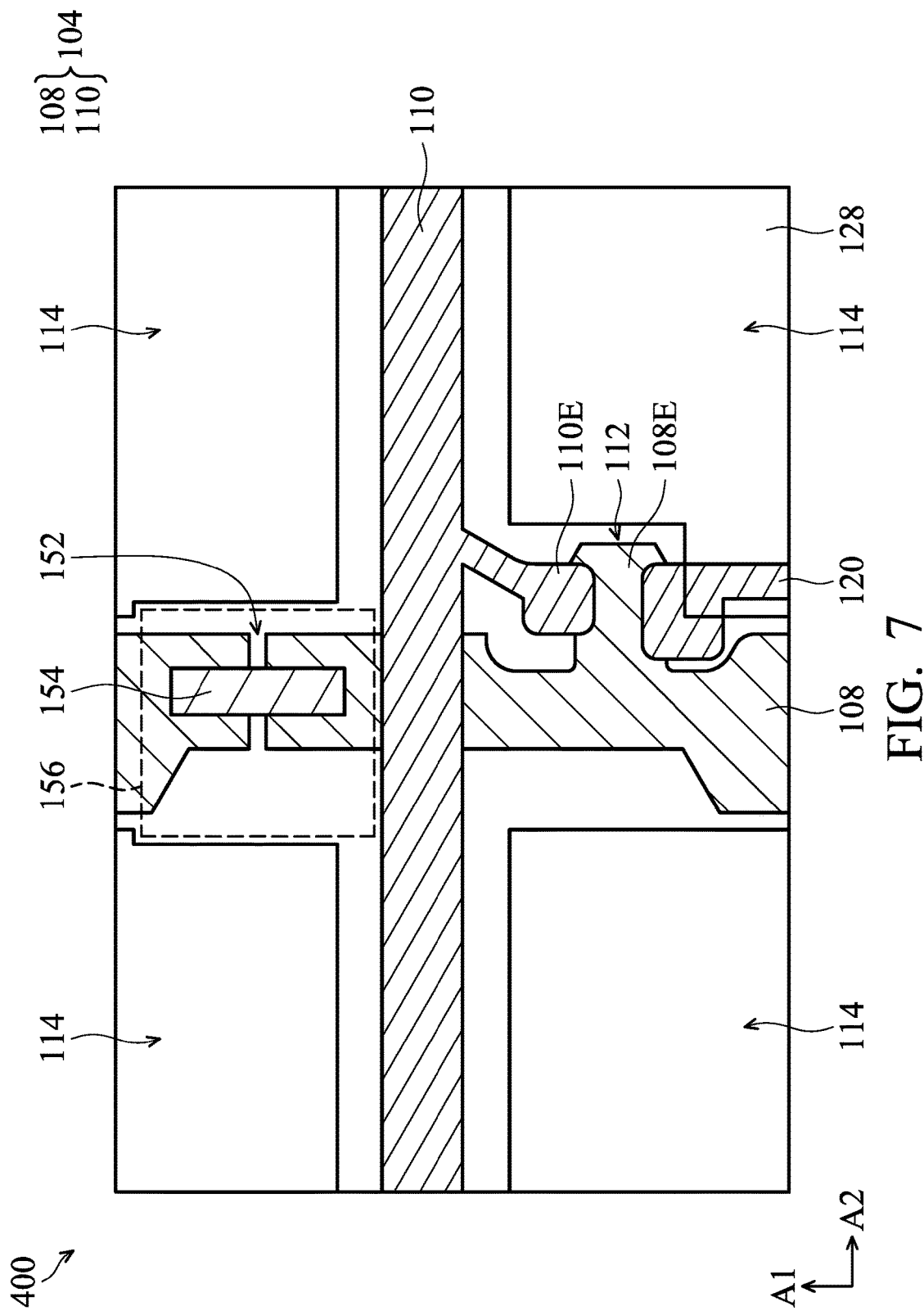
FIG. 7 is a top view of a thin film transistor substrate in accordance with another embodiment of the present disclosure.

It should be noted that the exemplary embodiment set forth in FIGS. 1-5 is merely for the purpose of illustration. In addition to the embodiment set forth in FIGS. 1-5, the electrical connection failure structure may be formed at other position as shown in FIGS. 6-7. This will be described in detail in the following description. Therefore, the inventive concept and scope are not limited to the exemplary embodiment shown in FIGS. 1-5.

FIG. 6 is a top view of a thin film transistor substrate 300 in accordance with another embodiment of the present disclosure. The difference between the embodiments shown in FIGS. 6 and 1-5 is that the electrical connection failure structure 146 is formed on one of the data lines 110. The electrical connection failure structure 146 is a broken portion of the data line 110. The repair line 148 has a rectangular shape. The repair line 148 is substantially parallel to the data line 110. The repair line 148 overlaps the data line 110. The repair line 148 electrically connects to the two portions of the data line 110 that are separated from each other by the electrical connection failure structure 146.

In addition, in this embodiment, the recess 150 only overlaps two sub-pixels 114 which are adjacent to the electrical connection failure structure 146.

FIG. 7 is a top view of a thin film transistor substrate 400 in accordance with another embodiment of the present disclosure. The difference between the embodiments shown in FIGS. 7 and 1-6 is that the electrical connection failure structure 152 is formed on one of the gate lines 108. The electrical connection failure structure 152 is a broken portion of the gate line 108. The repair line 154 has a rectangular shape. The repair line 154 is substantially parallel to the gate line 108. The repair line 154 overlaps the gate line 108. The repair line 154 electrically connects to the two portions of the gate line 108 that are separated from each other by the electrical connection failure structure 152.

In addition, in this embodiment, the recess 156 only overlaps two sub-pixels 114 which are adjacent to the electrical connection failure structure 152.

Figure 8:
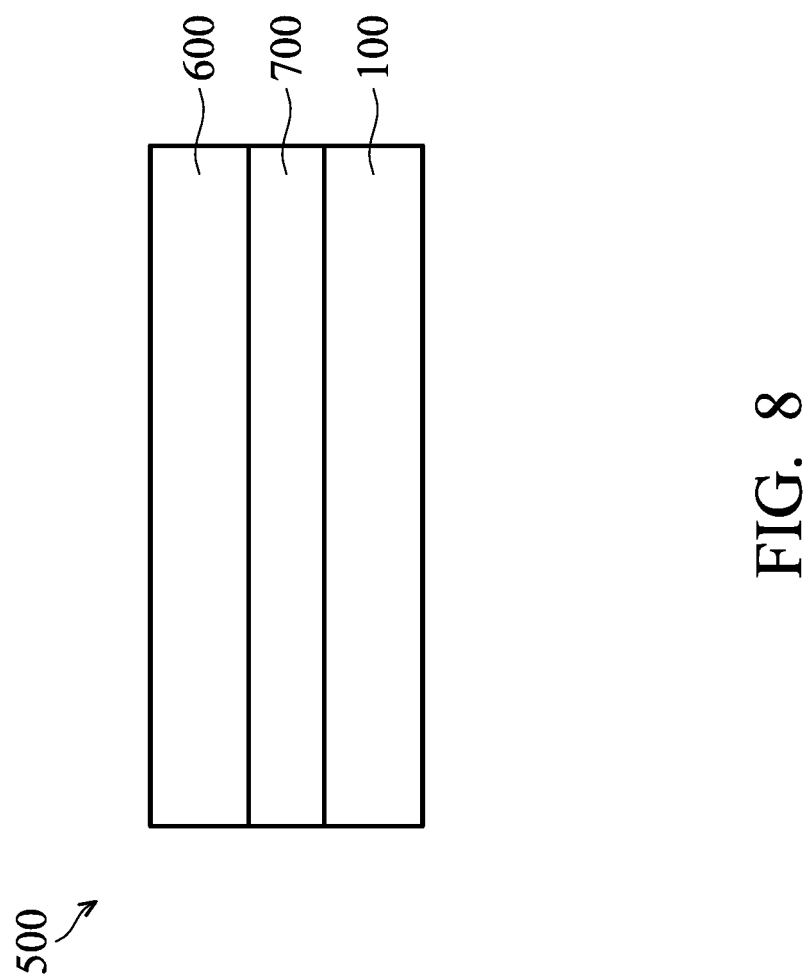
FIG. 8 is a cross-sectional view of a display device in accordance with some embodiments of the present disclosure.

In addition, the present disclosure also provides a display device 500 having the aforementioned thin film transistor substrate 100, as shown in FIG. 8. The display device 500 in FIG. 8 includes the thin film transistor substrate 100 of the present disclosure, an opposite substrate 600 disposed opposite to the thin film transistor substrate 100 and a display medium 700 disposed between the array substrate 100 and the opposite substrate 600. It should be noted that the aforementioned display device may also include the aforementioned thin film transistor substrates 200, 300 and 400.

The opposite substrate 600 may be a color filter substrate, a transparent substrate, or any other suitable substrate. The color filter substrate may include a transparent substrate and a color filter layer disposed over the transparent substrate. The transparent substrate may include, but is not limited to, a glass substrate, a ceramic substrate, a plastic substrate, or any other suitable transparent substrate.

The display medium 700 may be a liquid-crystal material. The liquid-crystal material may include, but is not limited to, nematic liquid crystal, smectic liquid crystal, cholesteric liquid crystal, blue phase liquid crystal, or any other suitable liquid-crystal material.

The display device 500 may include, but is not limited to, a liquid-crystal display such as a thin film transistor liquid-crystal display. Alternatively, the liquid-crystal display may include, but is not limited to, a twisted nematic (TN) liquid-crystal display, a super twisted nematic (STN) liquid-crystal display, a double layer super twisted nematic (DSTN) liquid-crystal display, a vertical alignment (VA) liquid-crystal display, an in-plane switching (IPS) liquid-crystal display, a cholesteric liquid-crystal display, a blue phase liquid-crystal display, or any other suitable liquid-crystal display.

It should be noted that, in addition to the electrical connection failure structure disclosed in the above embodiments, the electrical connection failure structure of the present disclosure may have other structures. For example, the electrical connection failure structure of the present disclosure may be a structure which results in a short circuit between the data line and the common electrode. In some embodiments, the electrical connection failure structure of the present disclosure may be a structure which results in a short circuit between the gate line and the common electrode. In some embodiments, the electrical connection failure structure of the present disclosure may be a structure which results in a short circuit between the data line and another data line. In some embodiments, the electrical connection failure structure of the present disclosure may be a structure which results in a short circuit between the data line and gate line. In some embodiments, the electrical connection failure structure of the present disclosure may be a structure which results in a short circuit between the data line and pixel electrode. In some embodiments, the electrical connection failure structure of the present disclosure may be a structure which results in a short circuit between the gate line and pixel electrode. In some embodiments, the electrical connection failure structure of the present disclosure may be a broken portion of the data line. In some embodiments, the electrical connection failure structure of the present disclosure may be a broken portion of the gate line. Therefore, the inventive concept and scope are not limited to the exemplary embodiment shown in FIGS. 1-8.

In summary, since the embodiment of the present disclosure utilizes a light-shielding layer which has an area greater than that of the repair line, the defects such as the light leak phenomenon due to the repair line may be shielded, which in turn improves the yield of the repaired thin film transistor substrate. In addition, since a low-dielectric constant material layer is further formed over the light-shielding layer, the aforementioned defects such as current leakage or light leakage may be prevented, which in turn further improves the yield of the repaired thin film transistor substrate.

Note that the above element sizes, element parameters, and element shapes are not limitations of the present disclosure. Those skilled in the art can adjust these settings or values according to different requirements. It should be understood that the thin film transistor substrate of the present disclosure are not limited to the configurations of FIGS. 1 to 8. The present disclosure may merely include any one or more features of any one or more embodiments of FIGS. 1 to 8. In other words, not all of the features shown in the figures should be implemented in the thin film transistor substrate of the present disclosure.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A thin film transistor substrate, comprising:
   a substrate;
   at least one signal line disposed over the substrate;
   a repair line disposed over the signal line and electrically connected to the signal line;
   a light-shielding layer disposed over the repair line, wherein the light-shielding layer covers the repair line, and an area of the light-shielding layer is greater than that of the repair line;
   a low-dielectric constant material layer disposed over the light-shielding layer;
   a protection layer disposed over the signal line;
   a pixel electrode disposed over the protection layer;
   a recess disposed in the protection layer;
   a contact hole extending downward from a bottom surface of the recess and exposing a portion of the signal line, wherein the repair line is disposed in the recess and is electrically connected to the signal line through the contact hole; and
   a space disposed between the repair line and a sidewall of the recess, wherein the light-shielding layer and the low-dielectric constant material layer are disposed in the recess, and the light-shielding layer and the low-dielectric constant material layer are both in direct contact with the sidewall of the recess.

2. The thin film transistor substrate as claimed in claim 1, wherein the pixel electrode is disposed outside a region to which the recess corresponds.

3. The thin film transistor substrate as claimed in claim 1, further comprising:
   a plurality of sub-pixels, wherein the recess overlaps at least one of the plurality of sub-pixels.

4. The thin film transistor substrate as claimed in claim 1, wherein a material of the light-shielding layer comprises high-dielectric constant material (high-k material), metal, black photoresist, black printing ink or black resin.

5. The thin film transistor substrate as claimed in claim 1, wherein a material of the low-dielectric constant material layer comprises phosphosilicate glass (PSG), borophosphosilicate glass (BPSG), fluorinated silicate glass (FSG), carbon-doped silicon oxide (SiOxCy), spin-on-glass, spin-on-polymers, silicon carbide material, or a compound thereof, or a composite material thereof, or a combination thereof.

6. The thin film transistor substrate as claimed in claim 1, wherein the signal line has an electrical connection failure structure.

7. The thin film transistor substrate as claimed in claim 1, wherein the signal line comprises a gate line or a data line.

8. A display device, comprising:
   a thin film transistor substrate;
   an opposite substrate disposed opposite to the thin film transistor substrate; and
   a display medium disposed between the thin film transistor substrate and the opposite substrate,
   wherein the thin film transistor substrate comprises:
   a substrate;
   at least one signal line disposed over the substrate;
   a repair line disposed over the signal line and electrically connected to the signal line; and
   a light-shielding layer disposed over the repair line, wherein the light-shielding layer covers the repair line, and an area of the light-shielding layer is greater than that of the repair line, wherein the thin film transistor substrate further comprises:
   a low-dielectric constant material layer disposed over the light-shielding layer;
   a protection layer disposed over the signal line;
   a pixel electrode disposed over the protection layer;
   a recess disposed in the protection layer;
   a contact hole extending downward from a bottom surface of the recess and exposing a portion of the signal line, wherein the repair line is disposed in the recess and is electrically connected to the signal line through the contact hole; and
   a space disposed between the repair line and a sidewall of the recess,
   wherein the light-shielding layer and the low-dielectric constant material layer are disposed in the recess, wherein the light-shielding layer and the low-dielectric constant material layer are both in direct contact with the sidewall of the recess.

9. The display device as claimed in claim 8, wherein the pixel electrode is disposed outside a region to which the recess corresponds.

10. The display device as claimed in claim 8, wherein the thin film transistor substrate further comprises:
    a plurality of sub-pixels, wherein the recess overlaps at least one of the plurality of sub-pixels.

11. The display device as claimed in claim 8, wherein a material of the light-shielding layer comprises high-dielectric constant material (high-k material), metal, black photoresist, black printing ink or black resin.

12. The display device as claimed in claim 8, wherein a material of the low-dielectric constant material layer comprises phosphosilicate glass (PSG), borophosphosilicate glass (BPSG), fluorinated silicate glass (FSG), carbon-doped silicon oxide (SiOxCy), spin-on-glass, spin-on-polymers, silicon carbide material, or a compound thereof, or a composite material thereof, or a combination thereof.

13. The display device as claimed in claim 8, wherein the signal line has an electrical connection failure structure.

14. The display device as claimed in claim 8, wherein the signal line comprises a gate line or a data line.

* * * * *